Sept. 12, 1933.  R. G. DENK  1,926,373

PRESSURE RELIEF VALVE

Filed Jan. 2, 1931

Inventor
RALPH G. DENK

By Owen H. Spencer
Attorney

Patented Sept. 12, 1933

1,926,373

UNITED STATES PATENT OFFICE 1,926,373

PRESSURE RELIEF VALVE

Ralph G. Denk, Peru, Ind.

Application January 2, 1931. Serial No. 506,029

2 Claims. (Cl. 137—53)

This invention relates to pressure relief valves of that class used primarily with water conveying pipe lines in which more or less pressure is encountered and the prime features of the invention is the provision of means for relieving the pressure in pipe line automatically.

A further feature of the invention is in so constructing the pressure relieving means that a perfect water seal will be formed on opposite sides of the valve mechanism forming a closure for the relief opening.

A further feature of the invention is in so constructing the valve structure for the relief vent means, that parts thereof will tear loose from the remainder of the valve structure, in the event parts of the valve structure become stuck to its seat and thus form an escape opening for relieving pressure in the pipe line before the danger point is reached.

A further feature of the invention is the provision of means for relieving pressure in the pipe line in the event of the destruction of parts of the valve structure.

A further feature of the invention is the provision of means for indicating when the valve structure is wrongly attached to the pipe line.

Other objects and advantages will be hereinafter more fully set forth and pointed out in the accompanying specification.

Figure 1:
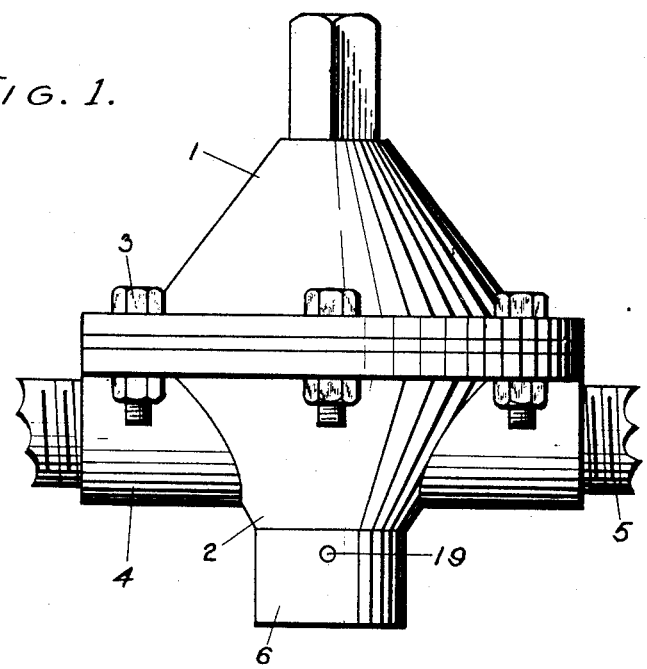
Figure 2:
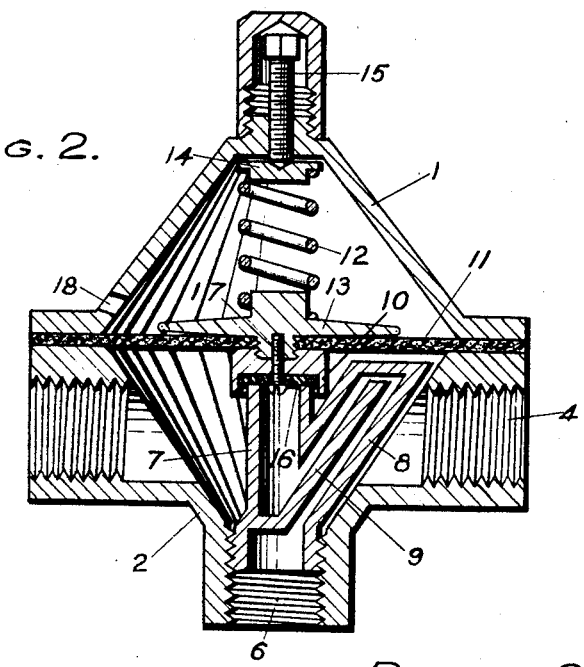

In the accompanying drawing which is made a part of this application,

Figure 1 is a side elevation of a relief valve applied to use in connection with a pipe line, and, Figure 2 is a vertical central sectional view therethrough.

Referring to the drawing, the numerals 1 and 2 indicate the companion sections of the valve structure, which are secured together in any suitable manner to form the valve housing, in this instance by means of bolts 3.

The lower section 2 of the housing is provided with threaded openings 4, by means of which the valve structure is attached to a pipe line 5, said section 2 also having a threaded port 6 in which may be secured any suitable form of drain pipe (not shown).

Mounted within the lower section 2 of the housing and preferably threading into the upper end of the port 6, is a combined trap and drain pipe 7, which has a laterally upwardly extending arm 8, in which is formed a baffle plate 9, the lower end of the baffle extending across the interior of the pipe 7 to form a by-pass through the arm 8 and cause the fluid passing through the drain pipe to pass upwardly over the upper end of the baffle before discharging through the port 6.

The upper end of the baffle plate 9 is slightly above the upper end of the pipe 7, so that a sufficient volume of water will be trapped in the pipe 7 to maintain a water seal against the under face of the valve proper 10, employed for normally closing the upper end of the pipe 7. As the water pressure within the pipe line is such that the water within the section 2 of the valve structure will extend above the valve proper 10, a water seal will be formed on both sides of the point of contact between the upper end of the pipe 7 and valve proper 10.

The valve proper 10 is connected to a diaphragm 11, the edges of which are secured between the meeting edges of the sections 1 and 2 to form a yielding partition between said sections 1 and 2, so that the pressure of the water passing through the lower section 2 of the valve structure will control the seating and unseating of the valve proper 10.

In order to determine the pressure required to raise the diaphragm a sufficient distance to unseat the valve 10, a pressure spring 12 is placed in the upper section 1, one end of which engages plate 13, resting upon the diaphragm 11, with the opposite end thereof engaging an adjusting block 14 at the upper end of the section 1, an adjusting screw 15 being threaded through the upper end of the section 1 for regulating the tension of the spring 12.

The valve proper 10 is preferably provided with a seat forming gasket 16, preferably of rubber or like resilient material, said gasket being secured to the plate 13 by means of a screw 17, so that in the event the gasket becomes stuck to the end of the pipe 7, the screw would tear through the gasket and thus form a hole for the escape of the water and thus reduce the pressure in the pipe line before injury could be done.

In the event the diaphragm, for any reason, should be punctured and fail to receive sufficient pressure to raise the valve proper from its seat, a vent 18 is formed through the wall of the section 1, so that the escaping water through said vent will reduce the pressure in said pipe line before reaching the danger point.

In order to prevent the possibility of wrongly installing the valve mechanism when it is connected with the pipe line 5, a port 19 is formed transversely through one wall of the section 2 and intersecting the drain port 6, so that in the event the valve structure is wrongly installed, water will flow through the port 19, thus giving notice that the wrong hookup had been made.

It will thus be seen that in addition to providing means for preventing undue pressure within the pipe line, a perfect water seal is formed at opposite sides of the valve proper, and it will likewise be seen that it will be impossible to wrongly install the valve mechanism in the pipe line, without being given notice to that effect.

While the description and drawing illustrates in a general way certain instrumentalities which may be employed in carrying the invention into effect, it is evident that many modifications may be made in the various details without departing from the scope of the appended claims, it being understood that the invention is not restricted to the particular examples herein described.

What I claim is:

1. In a pressure relief valve structure, an upper and lower section, a diaphragm dividing said sections, a drain pipe in the lower section, an arm associated with said drain pipe, a baffle forming a by-pass through said arm, the upper end of said baffle extending in a plane above the upper end of said drain pipe, and a valve proper adapted to seat over the upper end of said drain pipe, the meeting faces of said drain pipe and valve proper being water sealed when the valve is closed.

2. A pressure relief valve structure comprising a pair of hollow members, a diaphragm separating said hollow members, a drain pipe in one of said members, an arm associated with said drain pipe, a baffle forming a trap through said arm, the upper end of said baffle extending in a plane above the upper end of said drain pipe, a gasket associated with said valve proper, and means for attaching the gasket to said diaphragm, said attaching means being arranged to tear through said gasket and form an exhaust opening in the event said diaphragm functions and the gasket adheres to its seat.

RALPH G. DENK.